US012766586B2

(12) United States Patent
Pan et al.

(10) Patent No.: US 12,766,586 B2
(45) Date of Patent: Oct. 20, 2026

(54) NECKING METHOD, NECKING APPARATUS, AND BATTERY MANUFACTURING DEVICE

(71) Applicant: CONTEMPORARY AMPEREX TECHNOLOGY (HONG KONG) LIMITED, Hong Kong (CN)

(72) Inventors: Youcheng Pan, Ningde (CN); Liang Jiang, Ningde (CN); Hao Meng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 262 days.

(21) Appl. No.: 18/657,805

(22) Filed: May 8, 2024

(65) Prior Publication Data

US 2024/0286185 A1 Aug. 29, 2024

Related U.S. Application Data

(63) Continuation of application No. PCT/CN2022/094042, filed on May 20, 2022.

(51) Int. Cl.

*B21D 51/26* (2006.01)
*H01M 50/107* (2021.01)
*H01M 50/167* (2021.01)

(52) U.S. Cl.

CPC ...... *B21D 51/2638* (2013.01); *H01M 50/107* (2021.01); *H01M 50/167* (2021.01)

(58) Field of Classification Search

CPC .. B21D 51/26; B21D 51/263; B21D 51/2638; B21D 51/2607; B21D 51/16; B21D 19/02; B21D 19/046

See application file for complete search history.

(56) References Cited

U.S. PATENT DOCUMENTS 3,688,538 A * 9/1972 Hoyne ................. B21D 51/263 413/69
4,606,207 A * 8/1986 Slade ................... B21D 51/263 72/110

(Continued)

FOREIGN PATENT DOCUMENTS

CN 2757960 Y 2/2006
DE 3234881 A1 3/1984

(Continued)

OTHER PUBLICATIONS

Extended European Search Report issued Oct. 1, 2024 in European Patent Application No. 22942117.7.

(Continued)

*Primary Examiner* — Teresa M Ekiert
(74) *Attorney, Agent, or Firm* — XSENSUS LLP

(57) ABSTRACT

The present application provides a necking method, a necking apparatus, and a battery manufacturing device. The necking method is used for forming a necked portion on a shell with an open end. The necking method includes: forming an annular groove on the shell, where the annular groove extends in a circumferential direction of the shell; and expanding a width of the annular groove towards the open end to form the necked portion. The technical solution of the present application can effectively reduce deformation of the shell, ensure safety of an electrode assembly, and improve performance stability of a battery cell. Meanwhile, pre-necking the shell effectively reduce a risk of deformation resilience of the shell after the necked portion is formed, thereby improving machining precision and structural stability of the necked portion.

15 Claims, 9 Drawing Sheets

(56) References Cited

U.S. PATENT DOCUMENTS

| | | | | |
|---|---|---|---|---|
| 4,781,047 | A | 11/1988 | Bressan et al. | |
| 5,228,321 | A * | 7/1993 | Shibasaka .......... | B21D 51/2638 72/110 |
| 2009/0151863 | A1 * | 6/2009 | Teramoto ............... | B21D 17/04 425/141 |

FOREIGN PATENT DOCUMENTS

| | | | |
|---|---|---|---|
| JP | H06-210379 | A | 8/1994 |
| JP | H08-117907 | A | 5/1996 |
| JP | H10-216873 | A | 8/1998 |
| JP | 2011-204589 | A | 10/2011 |
| WO | 02/02257 | A1 | 1/2002 |

OTHER PUBLICATIONS

International Search Report and Written Opinion mailed on Dec. 21, 2022, received for PCT Application PCT/CN2022/094042, filed on May 20, 2022, 11 pages including English Translation.

* cited by examiner

NECKING METHOD, NECKING APPARATUS, AND BATTERY MANUFACTURING DEVICE

CROSS-REFERENCE TO RELATED APPLICATION

This application is a continuation of international application PCT/CN2022/094042, filed May 20, 2022, which is incorporated herein by reference in its entirety.

TECHNICAL FIELD

The present application relates to the field of battery production technology, and in particular, to a necking method, a necking apparatus, and a battery manufacturing device.

BACKGROUND ART

Energy conservation and emission reduction are the key to sustainable development of the automotive industry. Electric vehicles have become an important part of the sustainable development of the automotive industry due to their advantages in energy conservation and environmental protection. For the electric vehicles, the battery technology is an important factor related to their development.

In production of cylindrical batteries, a winding sealing technology for packaging battery cells can effectively improve the packaging speed. However, in existing technologies, short circuit faults occur frequently in battery cells packaged by the winding sealing technology, which seriously affects performance stability of the battery cells.

SUMMARY

The present application provides a necking method, a necking apparatus, and a battery manufacturing device. The necking method can effectively reduce a short circuit fault rate of battery cells and improve performance stability of the battery cells; and the necking apparatus can effectively reduce deformation of a shell and improve necking and flanging quality of the shell.

In a first aspect, the present application provides a necking method for forming a necked portion on a shell with an open end, the necking method including: forming an annular groove on the shell, where the annular groove extends in a circumferential direction of the shell; and expanding a width of the annular groove towards the open end to form the necked portion.

In the foregoing technical solution, when the shell is necked, the annular groove extending in the circumferential direction of the shell is first formed on the shell, and then the width of the annular groove is expanded towards the open end of the shell to form the necked portion on the shell. In the forming process of the necked portion, the open end of the shell is gradually folded outward to form a flanged portion. Before the shell is wound, sealed and packaged, an electrode assembly is required to be pre-assembled in the shell, and then the necked portion is formed on the shell (in a radial direction of the shell, a projection of the necked portion does not fall on the electrode assembly). Because the electrode assembly pre-assembled in the shell, a long enough support member cannot be disposed in the shell to limit compression deformation of the shell when the necked portion is formed. When the necked portion is directly formed on the shell, the shell has large compression deformation on a side, facing the electrode assembly, of the necked portion, the shell is prone to squeezing the electrode assembly, and the electrode assembly is easily deformed by pressure and short-circuited. According to the technical solution of the present application, the narrower annular groove is first formed before the necked portion is formed, that is, the shell is pre-necked, and the width of the annular groove is smaller than that of the finally formed necked portion, so the deformation of the shell by squeezing when the annular groove is formed is obviously smaller than that of the shell by squeezing when the necked portion is directly formed. Meanwhile, the annular groove on the shell limits a deformation area of the shell due to subsequent forming of the necked portion. As the shell has undergone stress deformation at the annular groove, when the width of the annular groove is expanded towards the open end of the shell, the annular groove effectively blocks transmission of pressure on the shell to reduce extension of the deformation area of the shell towards the electrode assembly, thereby effectively reducing the deformation area of the shell, preventing the electrode assembly inside the shell from being squeezed by excessive deformation of the shell, then effectively ensuring safety of the electrode assembly, and improving safety performance of the battery cell. Meanwhile, pre-necking the shell can effectively reduce a risk of deformation resilience of the shell after the necked portion is formed, thereby improving machining precision and structural stability of the necked portion.

According to some embodiments of the present application, the forming an annular groove on the shell includes: limiting the open end when forming the annular groove, so as to limit outward movement of the open end.

In the foregoing technical solution, limiting the open end of the shell when the annular groove is formed can effectively reduce deformation of the open end of the shell by force when the annular groove is formed, thereby reducing a risk of affecting the forming precision of the subsequent necked portion due to early deformation of the open end, and ensuring the forming precision and quality of the necked portion of the shell.

According to some embodiments of the present application, the expanding a width of the annular groove towards the open end to form the necked portion includes: releasing the limit on the open end when expanding the width of the annular groove, so that the open end is folded outward to form a flanged portion.

In the foregoing technical solution, when the necked portion is formed, the limit on the open end is released, which facilitates gradually outward folding of the open end to form the flanged portion with the formation of the necked portion, so as to achieve a purpose of directly forming the flanged portion on the open end of the shell by a necking process, where the flanged portion is used for winding sealing with a packaging member.

According to some embodiments of the present application, the necking method further includes: flattening the flanged portion.

In the foregoing technical solution, after the flanged portion is formed at the open end, the flanged portion is flattened, so that the outward folded angle of the flanged portion is controllable and more balanced, the flanging quality of the flanged portion and the stability of the flanged portion after folding are effectively improved, and the risk of resilient deformation of the flanged portion is reduced, thereby improving the precision and structural stability of the flanged portion and improving the packaging precision and yield of batteries.

According to some embodiments of the present application, the forming an annular groove on the shell includes: driving a first roller to rotate around the shell and feed in a radial direction of the shell to form the annular groove on the shell.

In the foregoing technical solution, the first roller rotates around the shell and is fed in the radial direction of the shell, so that the radius of rotation of the first roller gradually decreases, the first roller squeezes the shell while rotating, a stressed portion of the shell is compressed and deformed radially towards the center, and the annular groove is formed on the shell.

According to some embodiments of the present application, the first roller has a first surface and a second surface opposite in its axial direction, and the first surface is farther from the open end than the second surface; and the forming an annular groove on the shell further includes: driving the shell to move axially after driving the first roller to rotate around the shell and feed in the radial direction of the shell, so that the shell is deformed, making the first surface attach to a side wall of the annular groove facing the first surface.

In the foregoing technical solution, after the annular groove is formed, the shell is driven to move axially, so that the side wall, facing the first surface, of the annular groove fits the first surface of the first roller. The first surface corrects and limits the side wall of the annular groove, so that the side wall, fitting the first surface of the annular groove (namely, the side wall facing the electrode assembly) can extend in the radial direction of the shell as much as possible. The axial movement of the shell mates with the limiting effect of the first roller to greatly correct the deformation of the shell, thereby reducing the risk of compressing the electrode assembly by great deformation of the shell due to the formation of the annular groove.

According to some embodiments of the present application, the expanding a width of the annular groove towards the open end to form the necked portion includes: driving a second roller to rotate around the shell and feed in the radial direction of the shell to form the necked portion on the shell, where the second roller has a third surface and a fourth surface opposite in its axial direction, the third surface is farther from the open end than the fourth surface, and a plane where the third surface is located is between two axially surfaces of the first roller opposite in its axial direction.

In the foregoing technical solution, the second roller rotates around the shell and is fed in the radial direction of the shell, so that the radius of rotation of the second roller gradually decreases, the second roller squeezes the shell while rotating, the stressed portion of the shell is compressed and deformed radially towards the center, and the necked portion is formed on the shell. The plane where the third surface of the second roller is located is between the two axially opposite surfaces of the first roller, which enables the second roller to expand the width of the annular groove towards the open end of the shell.

In a second aspect, the present application provides a necking apparatus for forming a necked portion on a shell with an open end, the necking apparatus including: a first roller, configured to feed in a radial direction of the shell to form an annular groove on the shell; and a second roller, configured to feed in the radial direction of the shell to form a necked portion and a flanged portion on the shell; where the first roller has a first surface and a second surface opposite in its axial direction, and the second roller has a third surface and a fourth surface opposite in its axial direction, the third surface is farther from the open end than the fourth surface, and a plane where the third surface is located is between the first surface and the second surface.

In the foregoing technical solution, the necking apparatus is provided with the first roller and the second roller that can be fed in the radial direction of the shell, where the first roller and the second roller are separately used for forming an annular groove and a necked portion on the shell; the third surface of the second roller is located between the first surface and the second surface of the first roller, so that when the second roller acts on the shell, the width of the annular groove can be expanded in the axial direction of the shell towards the open end of the shell to form the necked portion, so as to avoid failure in limiting, by the annular groove, the deformation of the shell towards the electrode assembly due to an increase in the deformation area of the shell as the annular groove expands the annular groove away from the open end of the shell in the axial direction of the shell.

According to some embodiments of the present application, a thickness of the first roller is less than that of the second roller.

In the foregoing technical solution, the thickness of the first roller is smaller than that of the second roller, so as to decrease the width of the annular groove as much as possible and reduce squeezing on the electrode assembly. The thickness of the second roller is greater than that of the first roller, so as to meet a width requirement of the necked portion.

According to some embodiments of the present application, the necking apparatus further includes: an inner mold for supporting the shell from the interior of the shell, where the first roller and the second roller are disposed on a circumference of the inner mold.

In the foregoing technical solution, the necking apparatus is provided with the inner mold, the inner mold plays an internal supporting and limiting role on the shell, and the inner mold is used for cooperating with the first roller and the second roller to form a depth-controllable annular groove and necked portion on the shell.

According to some embodiments of the present application, the necking apparatus further includes: a press fitting member disposed around the inner mold, where the press fitting member is configured to: clamp the open end together with the inner mold when the first roller is fed in the radial direction of the shell, to limit outward movement of the open end.

In the foregoing technical solution, the necking apparatus is provided with the press fitting member, and the press fitting member mates with the inner mold to limit the open end of the shell, so as to limit the outward movement of the open end of the shell when the annular groove is formed on the shell.

According to some embodiments of the present application, the press fitting member is movable in an axial direction of the shell, and is configured to: flatten the outward folded open end on the second roller when the second roller is fed in the radial direction of the shell.

In the foregoing technical solution, the press fitting member is movable in the axial direction of the shell, so that the press fitting member has high functional integration. By controlling extension and retraction of the press fitting member in the axial direction of the shell, the open end can be clamped between the inner mold and the press fitting member or released. After the necked portion is formed, the flanged portion formed at the open end can be flattened by controlling the extension and retraction of the press fitting member, so as to effectively improve the precision and quality of the flanged portion of the shell. Therefore, the overall structure is highly flexible, the functional integration is strong, and the efficiency and effect of necking and flanging of the necking and flanging apparatus are effectively improved.

According to some embodiments of the present application, the press fitting member is annular, and the press fitting member is sleeved on the inner mold.

In the foregoing technical solution, the press fitting member is annular and sleeved on the inner mold, which effectively ensures the contact area between the press fitting member and the flanged portion, so that the overall flanged portion is stressed more evenly in the circumferential direction of the shell, and the flattening quality, balance, and comprehensiveness of the flanged portion are further improved.

According to some embodiments of the present application, an outer circumferential surface of the inner mold includes a first outer circumferential surface, a second outer circumferential surface, and a step surface, a diameter of the first outer circumferential surface is greater than that of the second outer circumferential surface, and the step surface connects the first outer circumferential surface and the second outer circumferential surface, where the press fitting member is annular, the press fitting member is sleeved on the first outer circumferential surface, the step surface is used for clamping, together with the press fitting member, the open end, the second outer circumferential surface is used for mating with the first roller to form the annular groove, and the second outer circumferential surface is used for mating with the second roller to form the necked portion.

In the foregoing technical solution, the press fitting member is sleeved on the first outer circumferential surface, so as to form a clamping space for clamping the open end between an inner circumferential surface of the press fitting member and the step surface; the step surface is used for mating with the inner circumferential surface of the shell to support the shell, defining the connection position of the flanged portion and the necked portion, and mating with the press fitting member to jointly clamp the open end; there is an avoidance space between the second outer circumferential surface and the inner circumferential surface of the shell, which facilitates feeding of the first roller and the second roller in the radial direction of the shell to form the annular groove and the necked portion on the shell; the second outer circumferential surface controls depths of the annular groove and the necked portion, and mates with the first roller and the second roller to define shapes of the annular groove and the necked portion, respectively; and the open end of the shell is affected by a diameter difference between the second outer circumferential surface and the step surface, and is naturally folded outward at the connection between the second outer circumferential surface and the step surface to form the flanged portion.

According to some embodiments of the present application, the step surface transitions to the second outer circumferential surface in an arc.

In the foregoing technical solution, the arc transition between the step surface and the second outer circumferential surface enables a smooth transition at a folded point of the flanged portion, and avoids fatigue crack or even fracture of the shell due to stress concentration at the folded point of the shell, thereby ensuring the structural strength of the shell.

According to some embodiments of the present application, the first roller and the second roller are spaced in a circumferential direction of the inner mold.

In the foregoing technical solution, the first roller and the second roller are spaced in the circumferential direction of the inner mold to avoid mutual interference between the first roller and the second roller.

According to some embodiments of the present application, the necking apparatus further includes: a support member for supporting the shell.

In the foregoing technical solution, the support member is configured to support and fix the shell, so as to ensure the stability of the shell under force.

According to some embodiments of the present application, the necking apparatus further includes: a first driving member for driving the support member up and down.

In the foregoing technical solution, the necking apparatus is provided with the first driving member to drive the support member to lift and lower, so as to drive the shell to move axially, which facilitates flexible adjustment on distances of the shell from the first roller, the second roller, and the inner mold in the axial direction of the shell.

In a third aspect, the present application provides a battery manufacturing device, including the necking apparatus described in any of the foregoing technical solutions, where the necking apparatus is used for forming a necked portion on a battery shell.

BRIEF DESCRIPTION OF DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
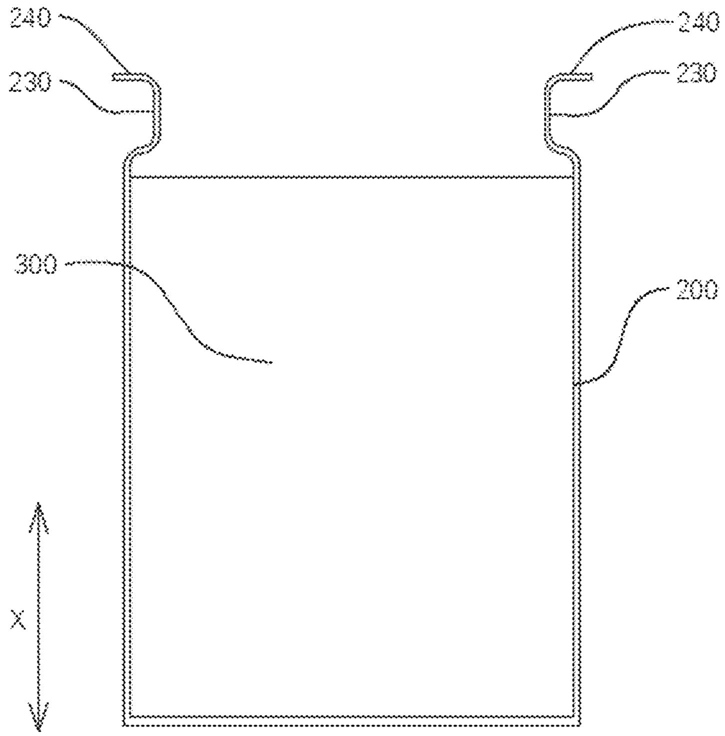
FIG. 1 is a schematic structural diagram of a shell formed with a necked portion and a flanged portion.

The drawings are not drawn to actual scale.

Reference numerals: 100—necking apparatus; 10—first roller; 11—first surface; 12—second surface; 20—second roller; 21—third surface; 22—fourth surface; 30—inner mold; 31—first outer circumferential surface; 32—second outer circumferential surface; 33—step surface; 40—press fitting member; 50—support member; 200—shell; 210—open end; 220—annular groove; 221—first side wall; 222—second side wall; 230—necked portion; 240—flanged portion; W—plane where the third surface is located.

DETAILED DESCRIPTION OF EMBODIMENTS

Implementations of the present application will be further described in detail below in conjunction with the accompanying drawings and embodiments. The detailed description of the following embodiments and the drawings are used for illustrating the principle of the present application, but cannot be used for limiting the scope of the present application, that is, the present application is not limited to the described embodiments.

In order to make the objectives, technical solutions and advantages of the embodiments of the present application clearer, the technical solutions in the embodiments of the present application will be described clearly and completely below in conjunction with the accompanying drawings in the embodiments of the present application. Apparently, the described embodiments are some of the embodiments of the present application, not all of them. Generally, components of the embodiments of the present application described and shown in the drawings may be arranged and designed with various different configurations.

Therefore, the detailed descriptions of the embodiments of the present application provided in the drawings below are not intended to limit the scope of the present application, but are merely representatives of the selected embodiments of the present application. All other embodiments obtained by those of ordinary skill in the art based on the embodiments of the present application without creative efforts shall fall within the protection scope of the present application.

The embodiments of the technical solutions of the present application will be described in detail below with reference to the accompanying drawings. The following embodiments are only used to illustrate the technical solutions of the present application more clearly, and therefore are only examples and cannot be used to limit the protection scope of the present application.

Unless otherwise defined, all technical and scientific terms used herein have the same meanings as those commonly understood by technical personnel in the technical field of the present application; the terms used herein are only for the purpose of describing specific embodiments and are not intended to limit the present application; and the terms "include" and "have" in the specification and claims of the present application, the accompanying drawings, and any variations thereof, are intended to cover non-exclusive inclusion.

In the description of the embodiments of the present application, the technical terms "first", "second", and the like are only used to distinguish different objects and cannot be understood as indicating or implying relative importance or implying a quantity, specific order, or primary and secondary relationship of the indicated technical features. In the description of the embodiments of the present application, the meaning of "a plurality of" is two or more, unless otherwise specifically defined.

The phrase "embodiment" referred to herein means that specific features, structures, or characteristics described in conjunction with the embodiment may be included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described herein may be combined with another embodiment.

In the description of the embodiments of the present application, the term "plurality" refers to two or more (including two).

In the description of the embodiments of the present application, an orientation or positional relationship indicated by the technical term "center", "longitudinal", "transverse", "length", "width", "thickness", "upper", "lower", "front", "back", "left", "right", "vertical", "horizontal", "top", "bottom", "internal", "external", "clockwise", "counterclockwise", "axial direction", "radial direction", "circumferential direction", or the like is based on an orientation or positional relationship shown in the drawings, and is merely for ease of describing the embodiments of the present application and simplifying the description, but does not indicate or imply that an apparatus or an element referred to must have a specific orientation or be constructed and operated in a specific orientation, and therefore cannot be understood as a limitation on the embodiments of the present application.

In the description of the embodiments of the present application, unless otherwise specified and defined, the technical terms "disposed", "mounted", "connected", "connection", "fixed", and the like should be understood in a broad sense, for example, "connection" may be a fixed connection, a detachable connection, an integration, a mechanical connection, an electrical connection, a signal connection, a direct connection, an indirect connection via an intermediate medium, communication between interiors of two elements, or interaction between two elements. Those of ordinary skill in the art may appreciate the specific meanings of the foregoing terms in the embodiments of the present application according to specific circumstances.

In the embodiments of the present application, the same reference numerals represent the same components, and for simplicity, detailed descriptions of the same components are omitted in different embodiments. It should be understood that, in the embodiments of the present application shown in the accompanying drawings, dimensions of various components and integrated apparatuses, such as thickness, length, and width, are only illustrative and should not constitute any limitations on the present application.

Winding sealing mentioned in the embodiments of the present application refers to a type of packaging used for a sealing process for rigid and semi-rigid containers. The winding sealing, also known as hemming sealing, refers to hooking, curling, and pressing a flanged container body and a rim of a container cover to seal a container. The winding sealing can be used for metal containers such as iron containers and aluminum containers or rigid and semi-rigid containers made of other materials.

The battery mentioned in the embodiments of the present application refers to a single physical module that includes one or more battery cells to provide higher voltage and capacity. For example, the battery mentioned in the present application may include a battery module or a battery pack.

Battery cells mentioned in the embodiments of the present application may include lithium-ion secondary batteries, lithium-ion primary batteries, lithium-sulfur batteries, sodium lithium-ion batteries, sodium-ion batteries, magnesium-ion batteries, or the like, which are not limited by the embodiments of the present application.

A battery cell includes a shell, an end cover, an electrode assembly, and an electrolytic solution, where the shell has an opening for assembling the electrode assembly, the electrolytic solution, and other components into the shell; the electrode assembly and the electrolytic solution are accommodated in the shell; and the end cover is used for closing the opening of the shell. There are currently two main ways to connect the end cover with the shell: welding and winding sealing. The winding sealing, as an efficient and fast sealing method, is increasingly applied to the production and manufacturing of cylindrical battery cells.

The electrode assembly consists of a positive electrode plate, a negative electrode plate, and a separator. The battery cell mainly relies on migration of metal ions between the positive electrode plate and the negative electrode plate to work. The positive electrode plate includes a positive electrode current collector and a positive electrode active material layer, a surface of the positive electrode current collector is coated with the positive electrode active material layer, and the positive electrode current collector not coated with the positive electrode active material layer protrudes from the positive electrode current collector coated with the positive electrode active material layer and is used as a positive electrode tab. In an example of a lithium-ion battery, a material of the positive electrode current collector may be aluminum, and a positive electrode active material may be lithium cobaltate, lithium iron phosphate, ternary lithium, lithium manganate, or the like. The negative electrode plate includes a negative electrode current collector and a negative electrode active material layer, a surface of the negative electrode current collector is coated with the negative electrode active material layer, and the negative electrode current collector not coated with the negative electrode active material layer protrudes from the negative electrode current collector coated with the negative electrode active material layer and is used as a negative electrode tab. A material of the negative electrode current collector may be copper, and a negative electrode active material may be carbon, silicon, or the like. In order to ensure that no fusing occurs when high current passes through, there is a plurality of positive electrode tabs laminated together, and there is a plurality of negative electrode tabs laminated together. A material of the separator may be polypropylene (PP), polyethylene (PE), or the like. Moreover, the electrode assembly may be of a wound structure or a laminated structure, and the embodiments of the present application are not limited thereto.

In the production of cylindrical batteries, the winding sealing technology for packaging battery cells can effectively improve the packaging speed. However, the applicant found that short circuit faults occur frequently in battery cells packaged by the winding sealing technology, which seriously affects performance stability of the battery cells.

The applicant found in research that, before the shell of the battery cell is sealed by the winding sealing process, a necked portion and a flanged portion are required to be formed at an end near the opening of the shell. Specifically (Refer to FIG. 1. FIG. 1 is a schematic structural diagram of a shell formed with a necked portion and a flanged portion): after the electrode assembly is assembled into the shell, the shell is necked to form the necked portion; as the necked portion is formed, the open end of the shell is gradually folded outward to form the flanged portion; and the flanged portion is ultimately connected to the cover by the winding sealing process, thereby forming a closed space in an inner cavity of the shell. When the necked portion is formed on the shell, the shell is deformed greatly by pressure on the necked portion on a side, facing the electrode assembly, of the necked portion, a deformation area radiates towards the electrode assembly, the deformed shell is prone to squeezing the electrode assembly, and the electrode assembly is easily deformed by pressure, resulting in short circuit faults.

Based on the above problems, in order to solve the problem of damage of the electrode assembly squeezed by excessive deformation of the shell when the necked portion is formed, the applicant conducted research and proposed a necking method for forming a necked portion on a shell. The necking method of the present application first forms an annular groove extending in a circumferential direction of the shell on the shell, and then expands a width of the annular groove towards an open end of the shell to form the necked portion.

According to the technical solution of the present application, the narrower annular groove is first formed before the necked portion is formed, that is, the shell is pre-necked, and the width of the annular groove is smaller than that of the finally formed necked portion, so the deformation of the shell by squeezing when the annular groove is formed is obviously smaller than that of the shell by squeezing when the necked portion is directly formed. Meanwhile, the annular groove on the shell limits a deformation area of the shell due to subsequent forming of the necked portion. As the shell has undergone stress deformation at the annular groove, when the width of the annular groove is expanded towards the open end of the shell, the annular groove effectively blocks transmission of pressure on the shell to reduce extension of the deformation area of the shell towards the electrode assembly, thereby effectively reducing the deformation area of the shell, preventing the electrode assembly inside the shell from being squeezed by excessive deformation of the shell, then effectively ensuring safety of the electrode assembly, and improving safety performance of the battery cell.

Moreover, compared to a method of directly forming a necked portion on a shell, the present application can effectively reduce difficulties in forming the necked portion. Meanwhile, pre-necking the shell can effectively reduce a risk of deformation resilience of the shell after the necked portion is formed, thereby improving machining precision and structural stability of the necked portion.

The necking method and necking apparatus disclosed in the embodiments of the present application can be used, but are not limited to, for shells of batteries, shells of solid or liquid food, shells of chemicals, and the like. For concise and clear description, the following embodiments are explained by an example of necking a battery shell.

Figure 2:
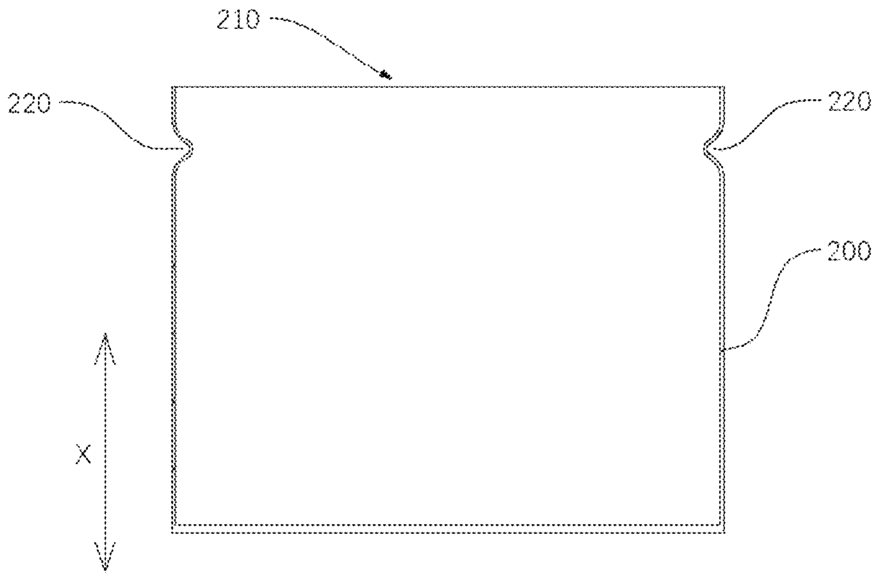
FIG. 2 is a schematic structural diagram of a shell formed with an annular groove.
Figure 3:
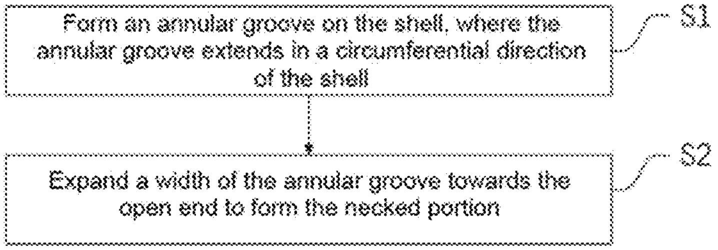
FIG. 3 is a flowchart of a flanging method by some embodiments of the present application.

According to some embodiments of the present application, refer to FIG. 1 and further refer to FIG. 2 and FIG. 3. FIG. 2 is a schematic structural diagram of a shell formed with an annular groove, and FIG. 3 is a flowchart of a flanging method provided by some embodiments of the present application. The necking method provided by this embodiment is used for forming a necked portion 230 on a shell 200, the shell 200 has an open end 210, and the necking method includes the following steps:

S1: Form an annular groove 220 on the shell 200, where the annular groove 220 extends in a circumferential direction of the shell 200; and S2: Expand a width of the annular groove 220 towards the open end 210 to form the necked portion 230.

The necked portion 230 refers to a portion of the shell 200 that undergoes radial shrinkage due to squeezing deformation, as shown in FIG. 1. An axial direction of the shell extends in an X direction, and a radial direction of the shell is perpendicular to the X direction. When the necked portion 230 is formed, the open end 210 of the shell 200 is bent outwards to form a flanged portion 240 described below. The flanged portion 240 is used for winding with an edge portion of an end cover (not shown) to achieve winding sealing.

The annular groove 220 extends in the circumferential direction of the shell 200, similar to forming the necked portion. The annular groove 220 can be formed by radial shrinkage of the shell 200 due to squeezing deformation.

The annular groove 220 may be formed on the shell 200 in various ways, which are not limited for uniqueness by this embodiment. For example, a roller movable in the radial direction of the shell 200 may be used, the roller is rotatable around its central axis, and the central axis of the roller is parallel to a central axis of the shell 200. When the annular groove 220 is formed on the shell 200, the shell 200 rotates around its central axis, the roller is fed in the radial direction of the shell 200, an outer circumferential surface of the roller is in contact with the shell 200 and squeezes the shell 200, the shell 200 is radially shrunk by the squeezing, and the annular groove 220 is formed on the shell 200. After the annular groove 220 is formed, the roller moves in the radial direction of the shell 200 and gets away from the shell 200.

Alternatively, in other embodiments, the shell 200 can remain stationary, and the roller rotates around the shell 200 and is fed in the radial direction of the shell 200 to form the annular groove 220 on the shell 200.

Similarly, the necked portion 230 is formed on the shell 200 by means of a roller movable in the radial direction of the shell 200, the roller is rotatable around its central axis, and the central axis of the roller is parallel to the central axis of the shell 200. When the annular groove 220 is formed on the shell 200, the shell 200 rotates around its central axis, the roller is fed in the radial direction of the shell 200, an outer circumferential surface of the roller is in contact with the shell 200 and squeezes the shell 200, the shell 200 is radially shrunk by the squeezing, and the necked portion 230 is formed on the shell 200. After the necked portion 230 is formed, the roller moves in the radial direction of the shell 200 and gets away from the shell 200.

Alternatively, in other embodiments, the shell 200 can remain stationary, and the roller rotates around the shell 200 and is fed in the radial direction of the shell 200 to form the necked portion 230 on the shell 200.

According to the technical solution of the present application, the narrower annular groove 220 is formed before the necked portion 230 is formed, equivalent to pre-necking the shell 200, which can effectively reduce difficulties in forming the necked portion 230 compared to a method of directly forming a necked portion 230 on a shell 200. In addition, the deformation of the shell 200 by squeezing when the annular groove 220 is formed is obviously smaller than that of the shell 200 by squeezing when the necked portion 230 is directly formed. Meanwhile, the annular groove 220 on the shell 200 limits a deformation area of the shell 200 due to subsequent forming of the necked portion 230. As the shell 200 has undergone stress deformation at the annular groove 220, when the width of the annular groove 220 is expanded towards the open end 210 of the shell 200, the annular groove 220 effectively blocks transmission of pressure on the shell 200 to reduce extension of the deformation area of the shell 200 towards the electrode assembly, thereby effectively reducing the deformation area of the shell 200, preventing the electrode assembly inside the shell 200 from being squeezed by excessive deformation of the shell 200, then effectively ensuring safety of the electrode assembly, and improving safety performance of the battery cell.

In some embodiments, the open end 210 of the shell 200 is limited when the annular groove 220 is formed on the shell 200, so as to limit outward movement of the open end 210.

The outward movement refers to movement away from the central axis of the shell 200.

When the annular groove 220 is formed on the shell 200, the shell 200 is deformed by force. The deformation of the shell 200 is manifested not only in a forming portion for the annular groove 220, but also in the outward movement of the open end 210 of the shell 200 due to the formation of the annular groove 220. After the open end 210 of the shell 200 moves outward, the regularity of its shape is reduced, which is not conducive to controlling precision and quality of the necked portion 230.

It can be understood that, when the annular groove 220 is formed on the shell 200, the position of the open end 210 of the shell 200 in the axial direction of the shell 200 changes to some extent due to the deformation of the shell 200, so axial movement of the open end 210 is not restricted when the open end 210 of the shell 200 is limited.

Limiting the open end 210 of the shell 200 when the annular groove 220 is formed can effectively reduce deformation of the open end 210 of the shell 200 by force when the annular groove 220 is formed, thereby reducing a risk of affecting the forming precision of the subsequent necked portion 230 due to early deformation of the open end 210, and ensuring the forming precision and quality of the necked portion 230 of the shell 200.

According to some embodiments of the present application, when the width of the annular groove 220 is expanded towards the open end 210 to form the necked portion 230, the limit on the open end 210 is released, so that the open end 210 is folded outward to form the flanged portion 240.

As mentioned above, when the necked portion 230 is formed, the open end 210 of the shell 200 is folded outward to form the flanged portion 240. That is, the flanged portion 240 can be formed by naturally outward folding with the formation of the necked portion 230 due to squeezing deformation of the shell 200. Therefore, the open end 210 of the shell 200 is in a free state when the necked portion 230 is formed, which facilitates formation of the necked portion 230 on the shell 200 and outward folding of the open end 210 to form the flanged portion 240.

When the necked portion 230 is formed, the limit on the open end 210 is released, which facilitates gradually outward folding of the open end 210 to form the flanged portion 240 with the formation of the necked portion 230, so as to achieve a purpose of directly forming the flanged portion 240 on the open end 210 of the shell 200 by a necking process.

According to some embodiments of the present application, the necking method further includes: flattening the flanged portion 240 after folding the open end 210 of the shell 200 outward to form the flanged portion 240.

Flattening the flanged portion 240 refers to shaping the flanged portion 240, so that the entire flanged portion 240 is located on or tends to a same plane, and a folded angle of the flattened flanged portion 240 relative to the axial direction of the shell 200 may be either a right angle or an acute angle. The folded angle of the flanged portion 240 relative to the axial direction of the shell 200 may be limited according to actual winding sealing requirements. For example, the folded angle of the flanged portion 240 relative to the axial direction of the shell 200 may be 90 degrees, that is, the flattened flanged portion 240 is perpendicular to the axial direction of the shell 200.

After the flanged portion 240 is formed at the open end 210, the flanged portion 240 is flattened, so that the outward folded angle of the flanged portion 240 is controllable and more balanced, the flanging quality of the flanged portion 240 and the stability of the flanged portion 240 after folding are effectively improved, and a risk of resilient deformation of the flanged portion 240 is reduced, thereby improving the precision and structural stability of the flanged portion 240 and improving the packaging precision and yield of batteries.

Figure 4:
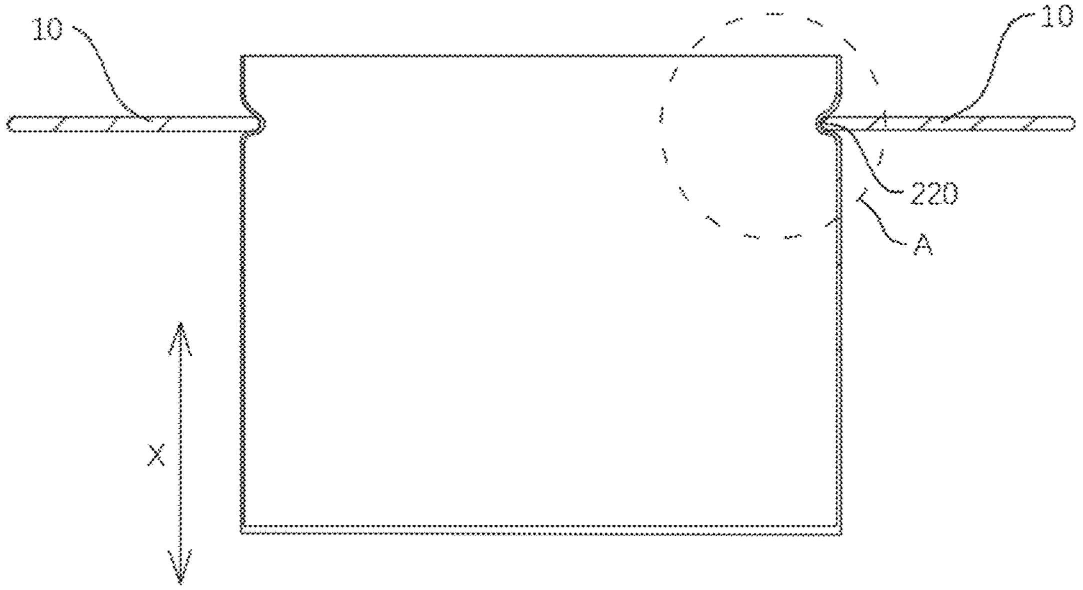
FIG. 4 is a schematic diagram of a state of forming an annular groove on a shell by means of a first roller in the flanging method provided by some embodiments of the present application.
Figure 5:
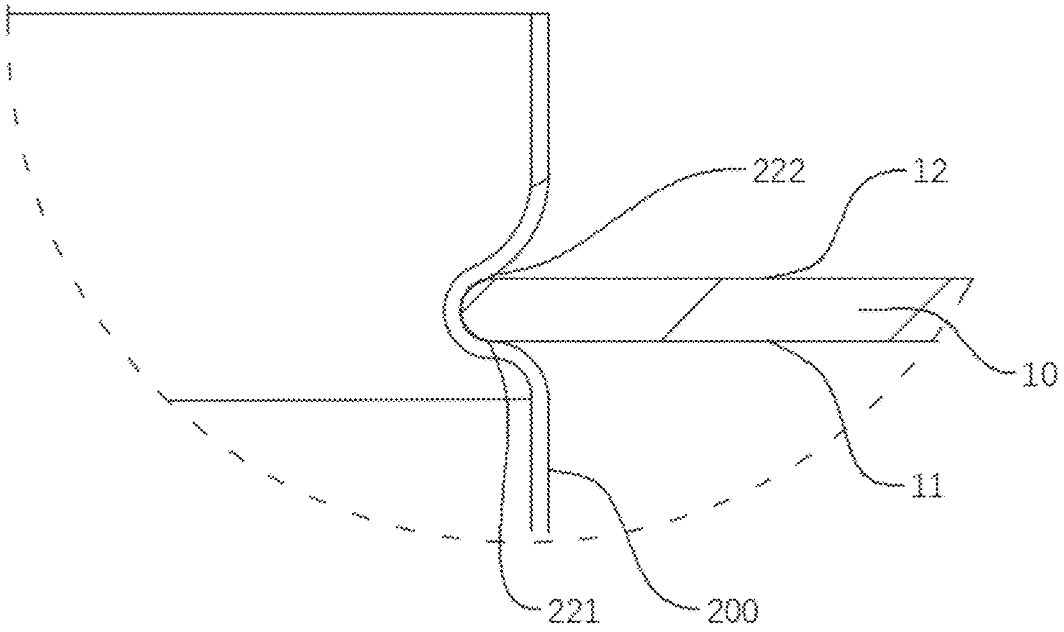
FIG. 5 is a partially enlarged view of part A shown in FIG. 4.

According to some embodiments of the present application, refer to FIG. 4 and FIG. 5. FIG. 4 is a schematic diagram of a state of forming an annular groove on a shell by means of a first roller in the flanging method provided by some embodiments of the present application.

FIG. 5 is a partially enlarged view of part A shown in FIG. 4. Forming the annular groove 220 on the shell 200 includes: driving a first roller 10 to rotate around the shell 200 and feed in the radial direction of the shell 200 to form the annular groove 220 on the shell 200.

It can be understood that the first roller 10 can rotate around its central axis to reduce friction between the first roller 10 and the shell 200, where the central axis of the first roller 10 can be parallel to the central axis of the shell 200.

A direction of driving the first roller 10 to rotate around the shell 200 and feed in the radial direction of the shell 200 may be implemented by matching manpower with mechanical mechanisms, or by automatic driving members. For example, a rotation driving mechanism and a linear driving mechanism may be configured, where the linear driving mechanism drives the first roller 10 to move in the radial direction of the shell 200, and the rotation driving mechanism drives the first roller 10 to rotate around the shell 200. The linear driving mechanism mates with the rotation driving mechanism to drive the first roller 10 to rotate around the shell 200 and feed in the radial direction of the shell 200, that is, drive the first roller 10 to rotate around the shell 200 with a gradual decrease in a radius of rotation, so as to squeeze the shell 200 and form the annular groove 220 on the shell 200.

It should be noted that, when the first roller 10 rotates around the shell 200, the shell 200 may remain stationary. Alternatively, the shell 200 may rotate around its central axis, but the rotation direction of the shell 200 should be opposite to the rotation direction of the first roller 10.

The first roller 10 rotates around the shell 200 and is fed in the radial direction of the shell 200, so that the radius of rotation of the first roller 10 gradually decreases, the first roller 10 squeezes the shell 200 while rotating, a stressed portion of the shell 200 is compressed and deformed radially towards the center, and the annular groove 220 is formed on the shell 200.

According to some embodiments of the present application, as shown in FIG. 5, the first roller 10 has a first surface 11 and a second surface 12 axially opposite, and the first surface 11 is farther from the open end 210 than the second surface 12; and forming an annular groove 220 on the shell 200 further includes: driving the shell 200 to move axially after driving the first roller 10 to rotate around the shell 200 and feed in the radial direction of the shell 200, so that the shell 200 is deformed, and the first surface 11 fits a side wall, facing the first surface 11, of the annular groove 220.

As shown in FIG. 5, the annular groove 220 includes a first side wall 221 and a second side wall 222 opposite in the axial direction of the shell 200, the first side wall 221 is farther from the open end 210 than the second side wall 222, the first side wall 221 faces the first surface 11 of the first roller 10, and the second side wall 222 faces the second surface 12 of the first roller 10.

As shown in FIG. 4 and FIG. 5, when the shell 200 is only subjected to the squeezing force of the first roller 10, after the shell 200 is radially deformed to form the annular groove 220, the first side wall 221 of the annular groove 220 easily forms an inclined surface. In this case, the shell 200 is driven to move axially, the first side wall 221 gradually approaches the first roller 10, the first surface 11 of the first roller 10 limits the first side wall 221, and the angle of inclination of the first side wall 221 is changed until the first side wall 221 is perpendicular or nearly perpendicular to the central axis of the shell 200.

The axial movement of the shell 200 mates with the limiting effect of the first roller 10 to greatly correct the deformation of the shell 200, thereby reducing the risk of compressing the electrode assembly by great deformation of the shell 200 due to the formation of the annular groove 220.

Figure 6:
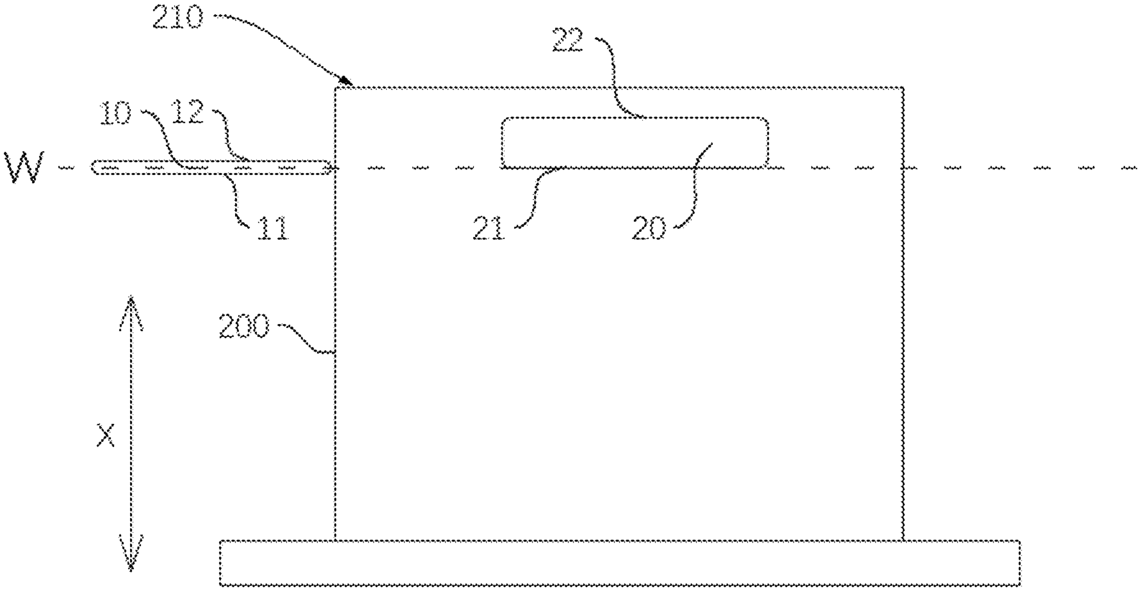
FIG. 6 is a main view of a necking apparatus mating with a shell according to some embodiments of the present application.

According to some embodiments of the present application, refer to FIG. 6. FIG. 6 is a main view of a necking apparatus mating with a shell according to some embodiments of the present application. Expanding a width of the annular groove 220 towards the open end 210 to form the necked portion 230 includes: driving a second roller 20 to rotate around the shell 200 and feed in the radial direction of the shell 200 to form the necked portion 230 on the shell 200, where the second roller 20 has a third surface 21 and a fourth surface 22 axially opposite, the third surface 21 is farther from the open end 210 than the fourth surface 22, and a plane W where the third surface 21 is located is between the two axially opposite surfaces of the first roller 10.

It can be understood that, similar to the structure of the first roller 10, the second roller 20 can rotate around its central axis to reduce friction between the second roller 20 and the shell 200, where the central axis of the second roller 20 can be parallel to the central axis of the shell 200.

A direction of driving the second roller 20 to rotate around the shell 200 and feed in the radial direction of the shell 200 may be implemented by matching manpower with mechanical mechanisms, or by automatic driving members. For example, a rotation driving mechanism and a linear driving mechanism may be configured, where the linear driving mechanism drives the second roller 20 to move in the radial direction of the shell 200, and the rotation driving mechanism drives the second roller 20 to rotate around the shell 200. The linear driving mechanism mates with the rotation driving mechanism to drive the second roller 20 to rotate around the shell 200 and feed in the radial direction of the shell 200, that is, drive the second roller 20 to rotate around the shell 200 with a gradual decrease in a radius of rotation, so as to squeeze the shell 200 and form the necked portion 230 on the shell 200.

It should be noted that, when the second roller 20 rotates around the shell 200, the shell 200 may remain stationary. Alternatively, the shell 200 may rotate around its central axis, but the rotation direction of the shell 200 should be opposite to the rotation direction of the second roller 20.

The plane where the third surface 21 is located is between the two axially opposite surfaces of the first roller 10, indicating that a projection of the third surface 21 of the second roller 20 falls within a projection of the first roller 10 in the radial direction of the shell 200. In this case, after the second roller 20 is fed in the radial direction of the shell 200, the second roller 20 can accurately expand the width of the annular groove 220 towards the open end 210 of the shell 200.

The second roller 20 rotates around the shell 200 and is fed in the radial direction of the shell 200, so that the radius of rotation of the second roller 20 gradually decreases, the second roller 20 squeezes the shell 200 while rotating, the stressed portion of the shell 200 is compressed and deformed radially towards the center, and the necked portion 230 is formed on the shell 200. The plane W where the third surface of the second roller 20 is located is between the two axially opposite surfaces of the first roller 10, which enables the second roller 20 fed in the radial direction of the shell 200 to expand the width of the annular groove 220 towards the open end 210 of the shell 200.

With continued reference to FIG. 1 to FIG. 6, some embodiments of the present application provide a necking apparatus 100. The necking apparatus 100 is used for forming a necked portion 230 on a shell 200, the shell 200 has an open end 210, and the necking apparatus 100 includes a first roller 10 and a second roller 20, where the first roller 10 is configured to feed in a radial direction of the shell 200 to form an annular groove 220 on the shell 200; and the second roller 20 is configured to feed in the radial direction of the shell 200 to form a necked portion 230 and a flanged portion 240 on the shell 200.

The first roller 10 has a first surface 11 and a second surface 12 axially opposite, the second roller 20 has a third surface 21 and a fourth surface 22 axially opposite, the third surface 21 is farther from the open end 210 than the fourth surface 22, and a plane where the third surface 21 is located is between the first surface 11 and the second surface 12.

As mentioned above, the first roller 10 and the second roller 20 can rotate around their central axes to reduce friction between the first roller 10 and the shell 200, where the central axes of the first roller 10 and the second roller 20 can be parallel to the central axis of the shell 200.

The first surface 11 and the second surface 12 refer to two axially opposite sides of the first roller 10, and the third surface 21 and the fourth surface 22 refer to two axially opposite sides of the second roller 20.

The first roller 10 may be connected to a linear driving member, and the linear driving member drives the first roller 10 to move in the radial direction of the shell 200, so that the first roller 10 can squeeze the shell 200, and the shell 200 is radially compressed and deformed by force to form the annular groove 220.

When the annular groove 220 is formed on the shell 200, the shell 200 can rotate around its central axis, the first roller 10 is fed in the radial direction of the shell 200, an outer circumferential surface of the first roller 10 is in contact with the shell 200 and squeezes the shell 200, the shell 200 is radially shrunk by the squeezing, and the annular groove 220 is formed on the shell 200. After the annular groove 220 is formed, the first roller 10 moves in the radial direction of the shell 200 and gets away from the shell 200.

Alternatively, in other embodiments, the shell 200 can remain stationary, and the first roller 10 rotates around the shell 200 and is fed in the radial direction of the shell 200 to form the annular groove 220 on the shell 200.

Similarly, the second roller 20 may also be connected to a linear driving member, and the linear driving member drives the second roller 20 to move in the radial direction of the shell 200, so that the second roller 20 can squeeze the shell 200, and the shell 200 is radially compressed and deformed by force to form the necked portion 230.

When the necked portion 230 is formed on the shell 200, the shell 200 can rotate around its central axis, the second roller 20 is fed in the radial direction of the shell 200, an outer circumferential surface of the second roller 20 is in contact with the shell 200 and squeezes the shell 200, the shell 200 is radially shrunk by the squeezing, and the necked portion 230 is formed on the shell 200. After the necked portion 230 is formed, the second roller 20 moves in the radial direction of the shell 200 and gets away from the shell 200.

Alternatively, in other embodiments, the shell 200 can remain stationary, and the second roller 20 rotates around the shell 200 and is fed in the radial direction of the shell 200 to form the necked portion 230 on the shell 200.

The plane where the third surface 21 is located is between the two axially opposite surfaces of the first roller 10, indicating that a projection of the third surface 21 of the second roller 20 falls within a projection of the first roller 10 in the radial direction of the shell 200. In this case, after the second roller 20 is fed in the radial direction of the shell 200, the second roller 20 can accurately expand the width of the annular groove 220 towards the open end 210 of the shell 200.

The necking apparatus 100 is provided with the first roller 10 and the second roller 20 that can be fed in the radial direction of the shell 200, where the first roller 10 and the second roller 20 are separately used for forming an annular groove 220 and a necked portion 230 on the shell 200; the third surface 21 of the second roller 20 is located between the first surface 11 and the second surface 12 of the first roller 10, so that when the second roller 20 acts on the shell 200, the width of the annular groove 220 can be expanded in the axial direction of the shell 200 towards the open end 210 of the shell 200 to form the necked portion 230, so as to avoid failure in limiting, by the annular groove 220, the deformation of the shell 200 towards the electrode assembly due to an increase in the deformation area of the shell 200 as the second roller 20 expands the annular groove 220 away from the open end 210 of the shell 200 in the axial direction of the shell 200.

According to some embodiments of the present application, as shown in FIG. 6, a thickness of the first roller 10 is smaller than that of the second roller 20.

The thickness of the first roller 10 refers to an axial thickness of the first roller 10. Similarly, the thickness of the second roller 20 refers to an axial thickness of the second roller 20. The thickness of the first roller 10 is positively correlated with the width of the annular groove 220 in the axial direction of the shell 200, and the thickness of the second roller 20 is positively correlated with the width of the necked portion 230 in the axial direction of the shell 200.

The thickness of the first roller 10 is smaller than that of the second roller 20, so as to decrease the width of the annular groove 220 as much as possible, which is beneficial to reducing the deformation of the shell 200 when the annular groove 220 is formed. The thickness of the second roller 20 is greater than that of the first roller 10, so as to meet a width requirement of the necked portion 230.

Figure 7:
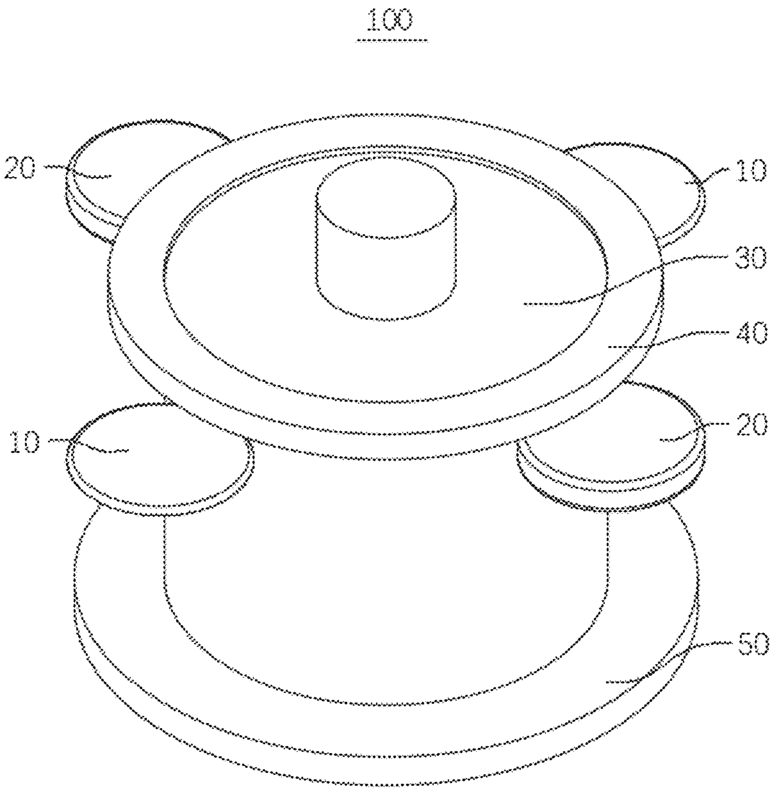
FIG. 7 is a schematic diagram of a three-dimensional structure of a necking apparatus provided by other embodiments of the present application.
Figure 8:
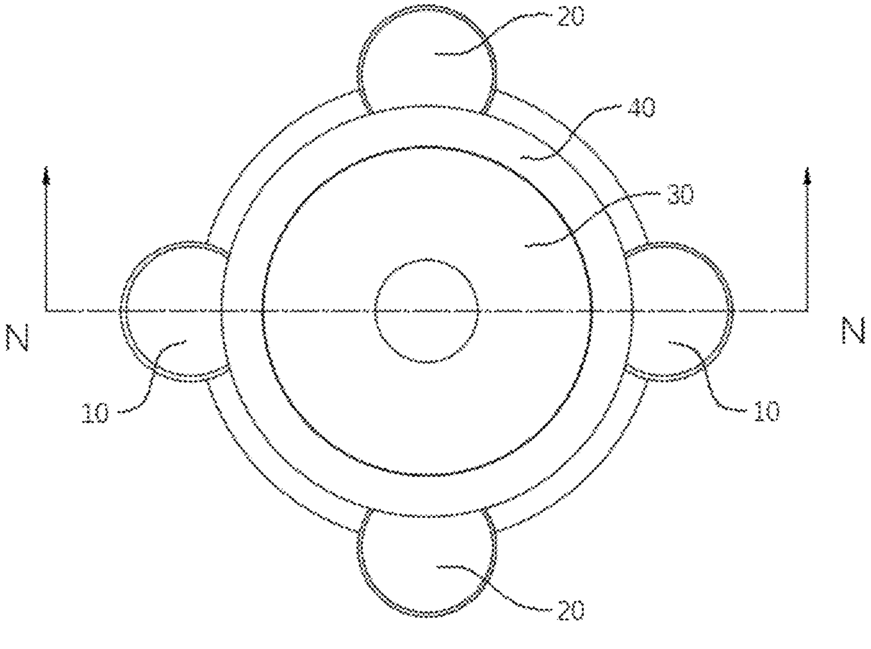
FIG. 8 is a top view of the necking apparatus provided by other embodiments of the present application.
Figure 9:
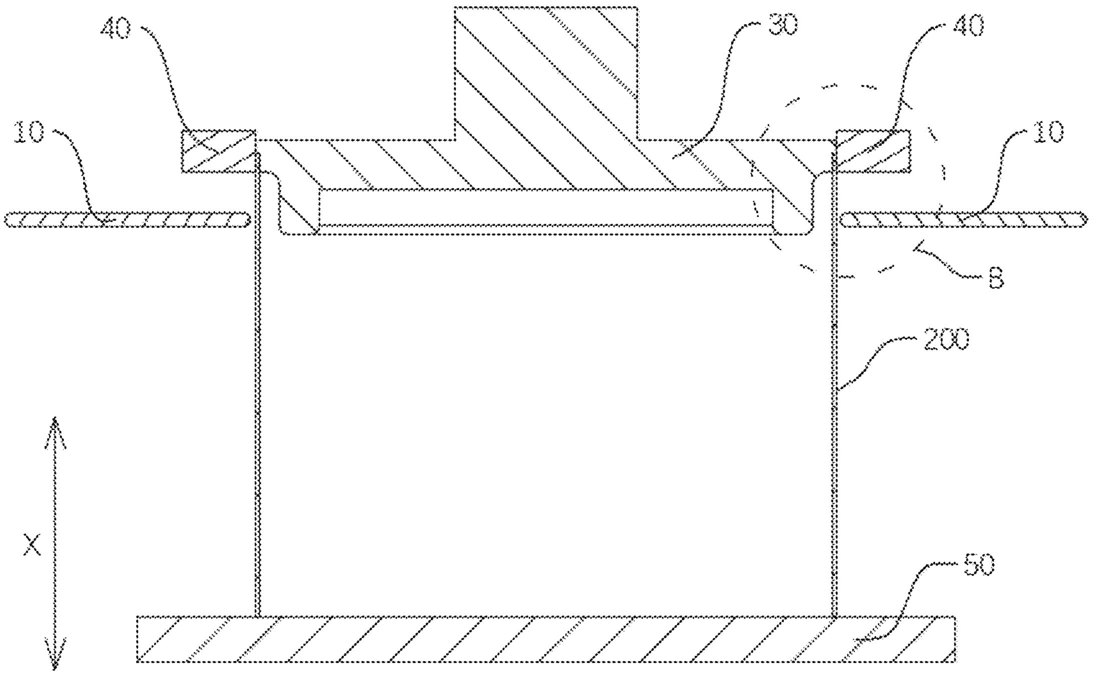
FIG. 9 is a cross-sectional view taken along line N-N shown in FIG. 8.
Figure 10:
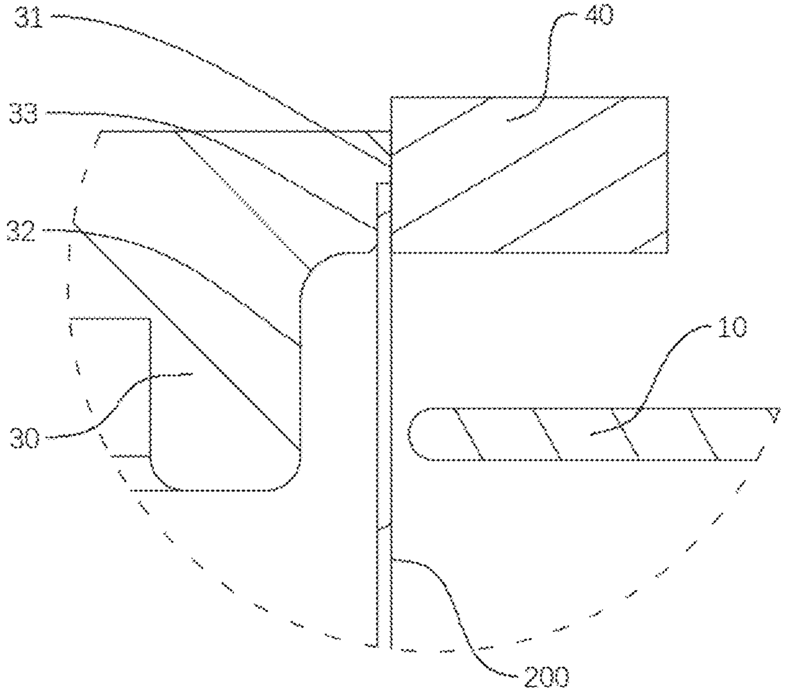
FIG. 10 is a partially enlarged view of part B shown in FIG. 9.

According to some embodiments of the present application, refer to FIG. 6 and further refer to FIG. 7 to FIG. 10. FIG. 7 is a schematic diagram of a three-dimensional structure of a necking apparatus provided by other embodiments of the present application, FIG. 8 is a top view of the necking apparatus provided by other embodiments of the present application, FIG. 9 is a cross-sectional view taken along line N-N shown in FIG. 8, and FIG. 10 is a partially enlarged view of part B shown in FIG. 9. The necking apparatus 100 further includes an inner mold 30, and the inner mold 30 is used for supporting the shell 200 from the inside of the shell 200, where the first roller 10 and the second roller 20 are disposed on the circumference of the inner mold 30.

The inner mold 30 is used for probing into the shell 200 via the open end 210 of the shell 200 to support the shell 200 from the inside of the shell 200, and limiting the depth of the finally formed necked portion 230 on the shell 200. The inner mold 30 may be connected to a linear driving member, and the linear driving member drives the inner mold 30 to move in its axial direction for easy extension into the shell 200 or exit from the shell 200. Alternatively, the position of the inner mold 30 may be fixed. When the position of the inner mold 30 is fixed, the shell 200 is moved in its axial direction, so that the open end 210 of the shell 200 is sleeved on the inner mold 30.

The axial direction of the inner mold 30 extends in the axial direction of the shell 200.

The necking apparatus 100 is provided with the inner mold 30, the inner mold 30 plays an internal supporting and limiting role on the shell 200, and the inner mold 30 is used for cooperating with the first roller 10 and the second roller 20 to form a depth-controllable annular groove 220 and necked portion 230 on the shell 200.

Figure 11:
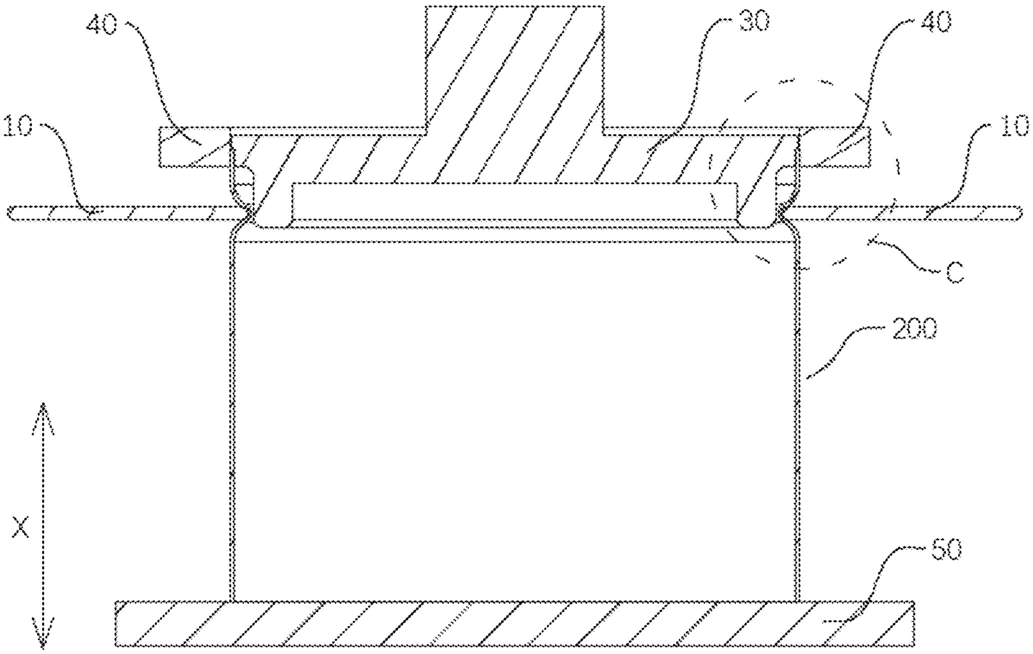
FIG. 11 is a schematic diagram of a state in which a first roller of the necking apparatus forms an annular groove on the shell according to some embodiments of the present application.
Figure 12:
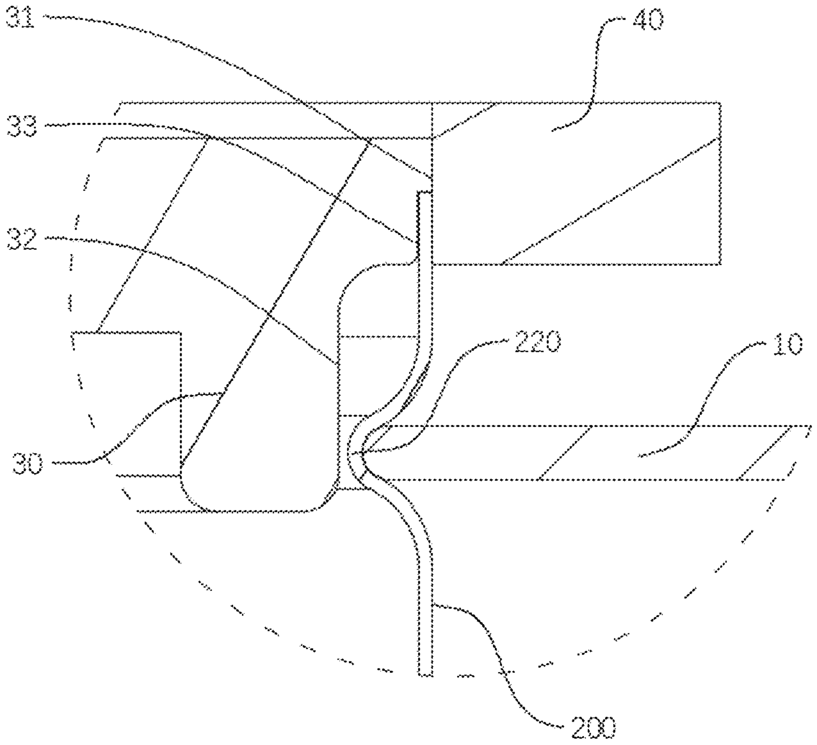
FIG. 12 is a partially enlarged view of part C shown in FIG. 11.

According to some embodiments of the present application, continue to refer to FIG. 7 to FIG. 10 and further refer to FIG. 11 and FIG. 12. FIG. 11 is a schematic diagram of a state in which a first roller of the necking apparatus forms an annular groove on the shell according to some embodiments of the present application, and FIG. 12 is a partially enlarged view of part C shown in FIG. 11. The necking apparatus 100 further includes a press fitting member 40, the press fitting member 40 is disposed on the circumference of the inner mold 30, and the press fitting member 40 is configured to clamp the open end 210 together with the inner mold 30 when the first roller 10 is fed in the radial direction of the shell 200, to limit outward movement of the open end 210.

The press fitting member 40 is disposed on the circumference of the inner mold 30, and the press fitting member 40 may be implemented in various structures. For example, the press fitting member 40 may include a plurality of sub press fitting portions, which are spaced in the circumferential direction of the shell 200. Alternatively, the press fitting member 40 may be of an integral structure. In order to increase the press fitting area of the press fitting member 40, the press fitting member 40 may be sleeved on the periphery of the inner mold 30.

The press fitting member 40 may be of a fixed structure integrally connected to the inner mold 30, or may be disposed separately and can move in the axial direction of the shell 200. For example, the press fitting member 40 is fixedly connected to the inner mold 30, and a limit gap may be reserved between the press fitting member 40 and a outer circumferential surface of the inner mold 30. When the annular groove 220 is formed on the shell 200, the shell 200 is driven to move axially, and the open end 210 of the shell 200 is inserted into the limit gap between the inner mold 30 and the press fitting member 40, so that the press fitting member 40 and the inner mold 30 clamp the open end 210 together.

The necking apparatus 100 is provided with the press fitting member 40, and the press fitting member 40 mates with the inner mold 30 to limit the open end 210 of the shell 200, so as to limit the outward movement of the open end 210 of the shell 200 when the annular groove 220 is formed on the shell 200, and to ensure the forming precision of the subsequent necked portion 230.

According to some embodiments of the present application, the press fitting member 40 is movable in the axial direction of the shell 200, and the press fitting member 40 is configured to flatten the outward folded open end 210 on the second roller 20 when the second roller 20 is fed in the radial direction of the shell 200.

The movement of the press fitting member 40 may be driven manually or driven by a linear driving mechanism. For example, the press fitting member 40 may be driven by a linear driving member such as a screw rod, a cylinder, or a single-axis manipulator.

Figure 13:
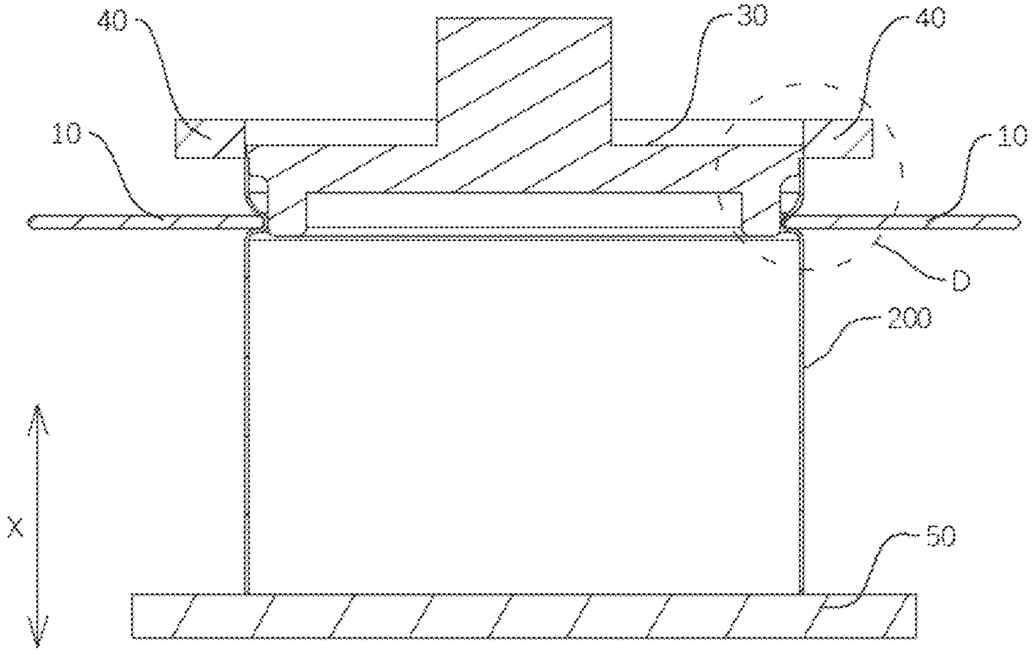
FIG. 13 is a schematic diagram of a state in which a first side wall of the annular groove fits a first surface of the first roller according to some embodiments of the present application.
Figure 14:
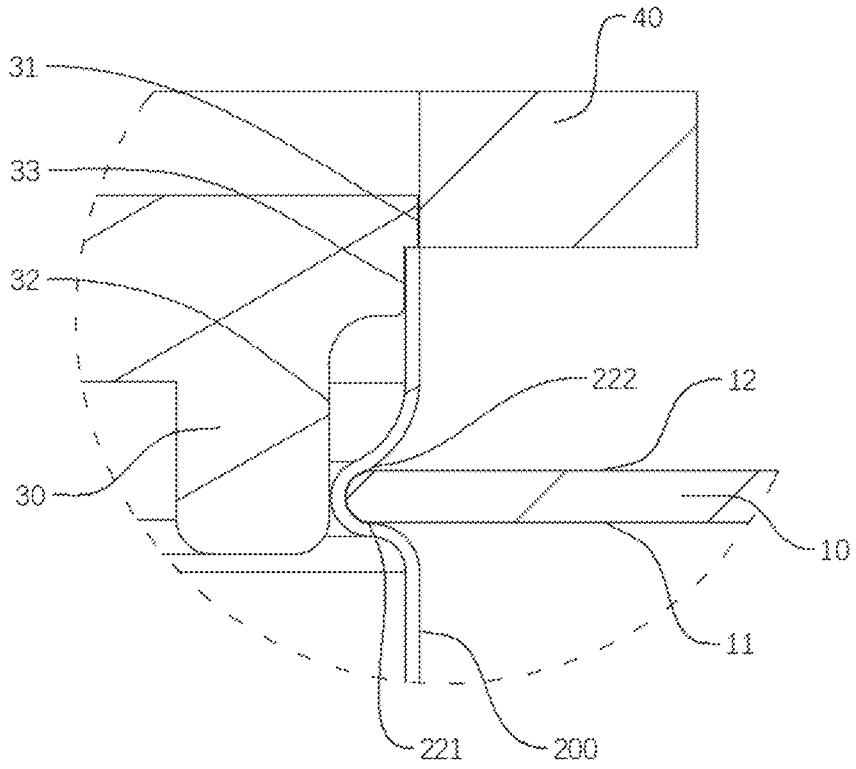
FIG. 14 is a partially enlarged view of part D shown in FIG. 13.
Figure 15:
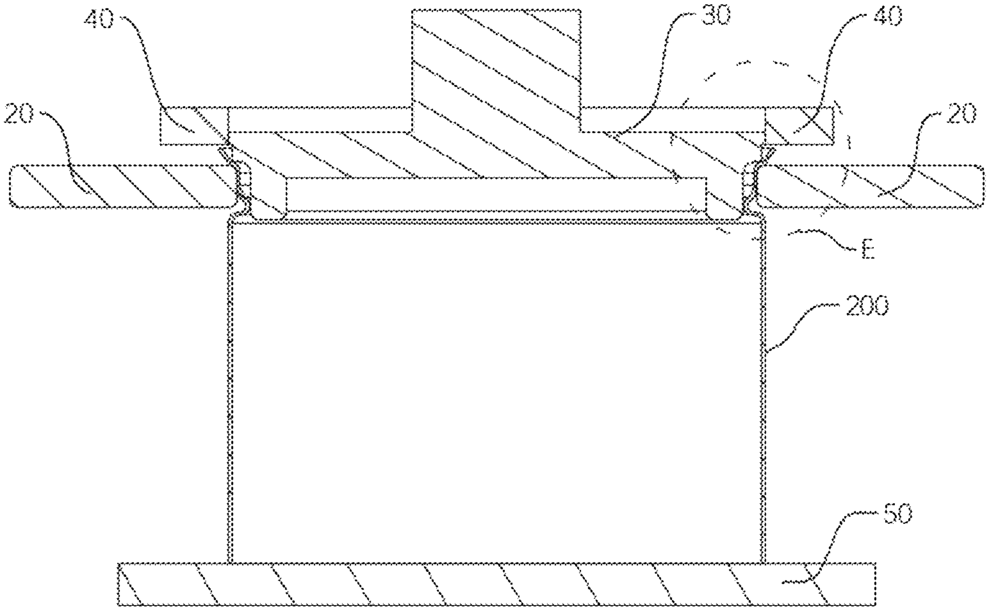
FIG. 15 is a schematic diagram of a state in which a second roller of a flanging apparatus forms a necked portion on the shell according to some embodiments of the present application.
Figure 16:
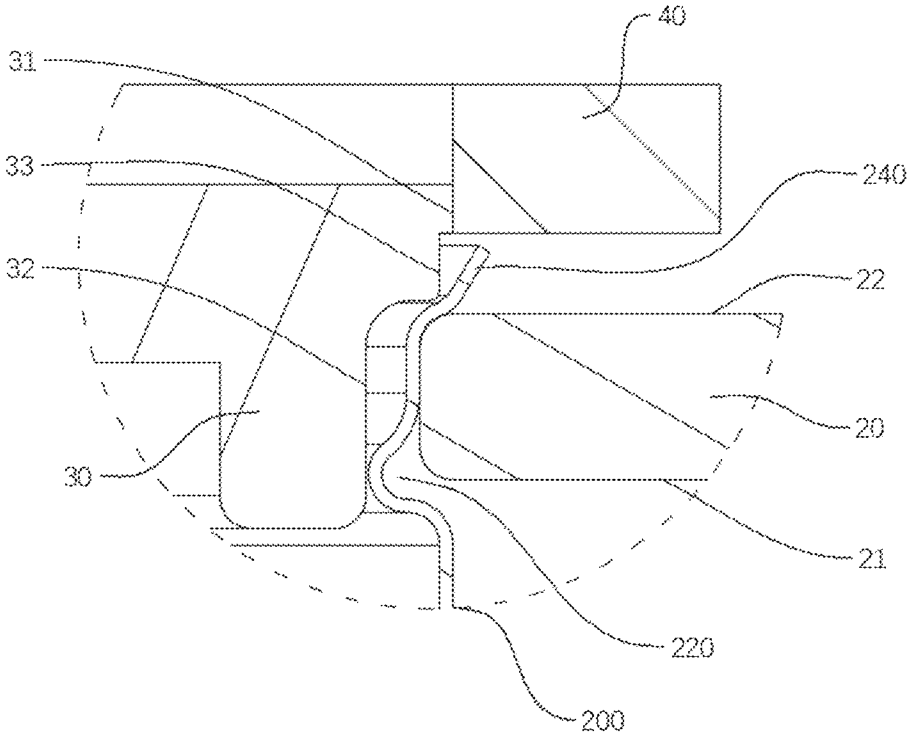
FIG. 16 is a partially enlarged view of part E shown in FIG. 15.
Figure 17:
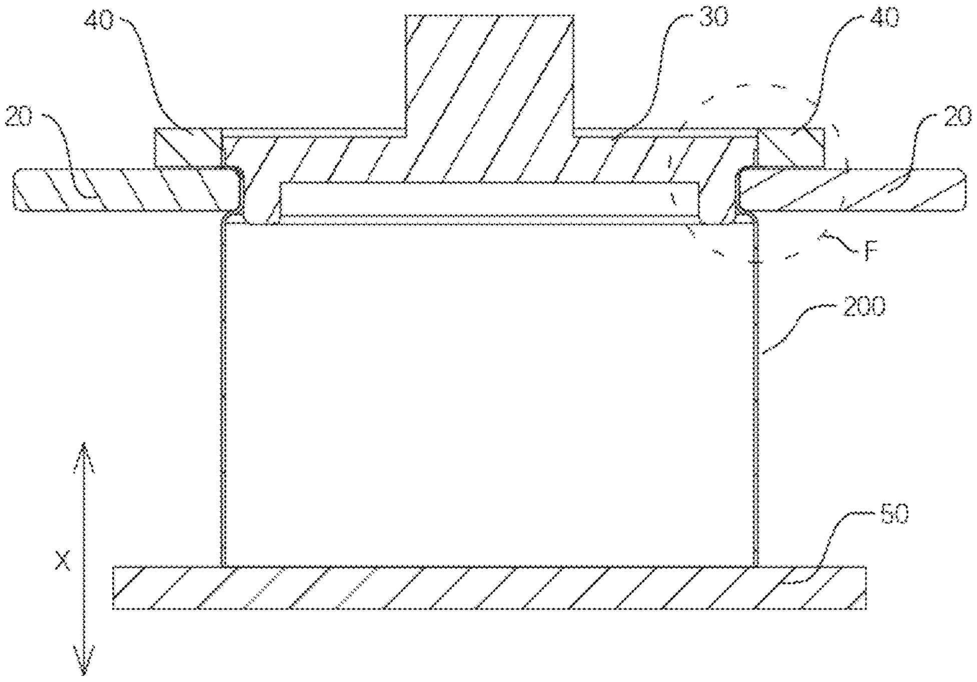
FIG. 17 is a schematic diagram of a state in which a press fitting member of a flanging apparatus flattens a flanged portion on the second roller according to some embodiments of the present application.
Figure 18:
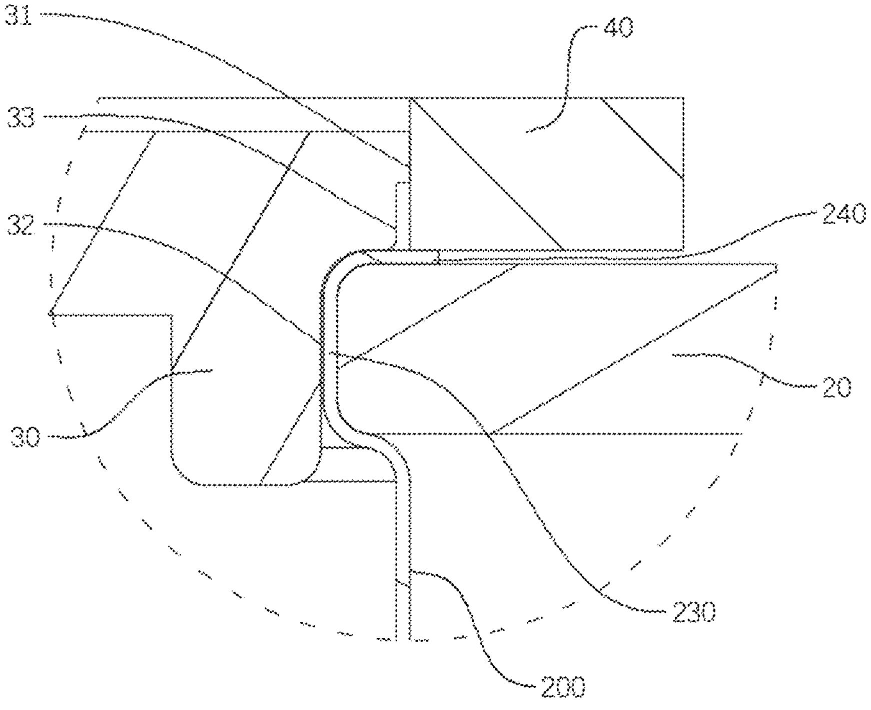
FIG. 18 is a partially enlarged view of part F shown in FIG. 17.

Continue to refer to FIG. 11 and FIG. 12, and further refer to FIG. 13 to FIG. 18. FIG. 13 is a schematic diagram of a state in which the first side wall of the annular groove fits the first surface of the first roller according to some embodiments of the present application, FIG. 14 is a partially enlarged view of part D shown in FIG. 13, FIG. 15 is a schematic diagram of a state in which a second roller of a flanging apparatus forms a necked portion on the shell according to some embodiments of the present application, FIG. 16 is a partially enlarged view of part E shown in FIG. 15, FIG. 17 is a schematic diagram of a state in which a press fitting member of the flanging apparatus flattens a flanged portion on the second roller according to some embodiments of the present application, and FIG. 18 is a partially enlarged view of part F shown in FIG. 17.

After the first roller 10 forms the annular groove 220 on the shell 200, when the second roller 20 is fed in the radial direction of the shell 200, the diameter of the stressed portion of the shell 200 gradually decreases to form the necked portion 230. With the formation of the necked portion 230, the open end 210 of the shell 200 is folded outward to initially form the flanged portion 240. When the second roller 20 is fed in the radial direction of the shell 200, the press fitting member 40 is driven to move towards the second roller 20 in the axial direction of the shell 200, to gradually flatten the outward folded open end 210 on the fourth surface 22 of the second roller 20.

The press fitting member 40 is movable in the axial direction of the shell 200, so that the press fitting member 40 has high functional integration. By controlling extension and retraction of the press fitting member 40 in the axial direction of the shell 200, the open end 210 can be clamped between the inner mold 30 and the press fitting member 40 or the open end 210 can be released. After the necked portion 230 is formed, the flanged portion 240 formed at the open end 210 can be flattened by controlling the extension and retraction of the press fitting member 40, so as to effectively improve the precision and quality of the flanged portion 240 of the shell 200. Therefore, the overall structure is highly flexible, the functional integration is strong, and the efficiency and effect of necking and flanging of the necking and flanging apparatus are effectively improved.

According to some embodiments of the present application, with reference to FIG. 7 again, the press fitting member 40 is annular, and the press fitting member 40 is sleeved on the inner mold 30.

The press fitting member may be an annular member with an integrated structure, or may be of an annular structure formed by splicing at least two portions. For example, the press fitting member 40 may be of an annular structure formed by splicing two semi-annular portions.

In other embodiments, in order to improve the stability of movement of the press fitting member 40 in the axial direction of the shell 200, the press fitting member may be connected to the inner mold 30 in a sliding manner through a structure such as a guide rail component. For example, a guide rail extending in an axial direction of the inner mold 30 (namely, the axial direction of the shell 200) is disposed on the inner mold 30, a guide groove matching the guide rail is disposed on the press fitting member 40, and the guide rail passes through the guide groove to connect the inner mold 30 and the press fitting member 40 in the sliding manner. Alternatively, the guide rail is disposed on the press fitting member 40, and the guide groove is disposed on the inner mold 30.

The press fitting member 40 is annular and sleeved on the inner mold 30, which effectively ensures the contact area between the press fitting member 40 and the flanged portion 240, so that the overall flanged portion 240 is stressed more evenly in the circumferential direction of the shell 200, and the flattening quality, balance, and comprehensiveness of the flanged portion 240 are further improved.

According to some embodiments of the present application, with reference to FIG. 12 and FIG. 16 again, the outer circumferential surface of the inner mold 30 includes a first outer circumferential surface 31, a second outer circumferential surface 32, and a step surface 33, a diameter of the first outer circumferential surface 31 is greater than that of the second outer circumferential surface 32, and the step surface 33 connects the first outer circumferential surface 31 and the second outer circumferential surface 32, where the press fitting member 40 is annular, the press fitting member 40 is sleeved on the first outer circumferential surface 31, the step surface 33 is used for clamping the open end 210 together with the press fitting member 40, the second outer circumferential surface 32 is used for mating with the first roller 10 to form the annular groove 220, and the second outer circumferential surface 32 is used for mating with the second roller 20 to form the necked portion 230.

As shown in FIG. 12 and FIG. 16, the first outer circumferential surface 31 is closer to the open end 210 of the shell 200 in the axial direction of the shell 200, the diameter of the first outer circumferential surface 31 is greater than an inner diameter of the shell 200, a diameter of the step surface 33 is adapted to the inner diameter of the shell 200 to ensure that the step surface 33 abuts against an inner circumferential surface of the shell 200, the second outer circumferential surface 32 is used for mating with the first roller 10 to form the annular groove 220 on the shell 200 and mating with the second roller 20 to form the necked portion 230 on the shell 200, the second roller 20 applies force to the shell 200 to ensure that a wall surface of the shell 200 abuts against the second outer circumferential surface 32, and the open end 210 of the shell 200 can be folded outward and deformed along the connection between the step surface 33 and the second outer circumferential surface 32 to form the flanged portion 240.

The press fitting member 40 is sleeved on the first outer circumferential surface 31, so as to form a clamping space for clamping the open end 210 between an inner circumferential surface of the press fitting member 40 and the step surface 33; the step surface 33 is used for mating with the inner circumferential surface of the shell 200 to support the shell 200, defining the connection position of the flanged portion 240 and the necked portion 230, and mating with the press fitting member 40 to jointly clamp the open end 210; there is an avoidance space between the second outer circumferential surface 32 and the inner circumferential surface of the shell 200, which facilitates feeding of the first roller 10 and the second roller 20 in the radial direction of the shell 200 to form the annular groove 220 and the necked portion 230 on the shell 200; the second outer circumferential surface controls depths of the annular groove 220 and the necked portion 230, and mates with the first roller 10 and the second roller 20 to define shapes of the annular groove 220 and the necked portion 230, respectively; and the open end 210 of the shell 200 is affected by a diameter difference between the second outer circumferential surface 32 and the step surface 33, and is naturally folded outward at the connection between the second outer circumferential surface 32 and the step surface 33 to form the flanged portion 240.

According to some embodiments of the present application, as shown in FIG. 12, the step surface 33 transitions to the second outer circumferential surface 32 in an arc.

The arc transition between the step surface 33 and the second outer circumferential surface 32 enables a smooth transition at a folded point of the flanged portion 240, which can effectively avoid fatigue crack or even fracture of the shell 200 due to stress concentration at the folded point of the shell 200, thereby ensuring the structural strength of the shell 200.

According to some embodiments of the present application, with reference to FIG. 8 again, the first roller 10 and the second roller 20 are spaced in the circumferential direction of the inner mold 30.

It may be understood that one or more first rollers 10 and one or more second rollers 20 may be configured. For example, two, three, or even more first rollers 10 may be configured. Similarly, two, three, or even more second rollers 20 may be configured.

For example, as shown in FIG. 8, two first rollers 10 and two second rollers 20 are configured, the two first rollers 10 are uniformly distributed in the circumferential direction of the inner mold 30, the two second rollers 20 are also uniformly distributed in the circumferential direction of the inner mold 30, and any first roller 10 and any second roller 20 are spaced in the circumferential direction of the inner mold 30.

The first roller 10 and the second roller 20 are spaced in the circumferential direction of the inner mold 30 to avoid mutual interference when the first roller 10 and the second roller 20 are fed in the radial direction of the shell 200.

According to some embodiments of the present application, as shown in FIG. 8 and FIG. 11, the necking apparatus 100 further includes a support member 50 used for supporting the shell 200.

As mentioned earlier, when the annular groove 220 and the necked portion 230 are formed on the shell 200, the shell 200 can remain stationary or rotate around its central axis. When the shell 200 is required to remain stationary, the support member 50 may include a fixing mechanism to fix the shell 200. The fixing mechanism may be an openable clamping mechanism to implement detachable fixation of the shell 200. Because the solution of fixing the shell 200 by the clamping mechanism is a conventional solution in the necking and flanging process, this embodiment does not elaborate on the fixing mechanism. For example, the fixing mechanism may include two opposite V-shaped blocks and two linear driving members (such as linear cylinders), a driving end of each linear driving member is connected to a V-shaped block, the two linear driving members drive the two V-shaped blocks to move oppositely in the radial direction of the shell 200 to clamp the shell 200 between the two V-shaped blocks, and the two linear driving members drive the two V-shaped blocks to move away from each other in the radial direction of the shell 200 to release the clamping and positioning of the shell 200.

If the shell 200 is required to rotate around its central axis, the support member 50 may further be provided with a rotation driving mechanism, which drives the shell 200 fixed by the fixing mechanism to rotate around its central axis. Because the solution of driving the shell 200 to rotate by the rotation driving mechanism is a conventional solution in the necking and flanging process, this embodiment does not elaborate on the rotation driving mechanism. For example, the rotation driving mechanism may include a turntable driven by a motor, the fixing mechanism used for fixing the shell 200 is disposed on the turntable, the shell 200 is fixed by the fixing mechanism, and the motor drives the turntable to rotate, so as to drive the shell 200 fixed on the turntable to rotate.

The support member 50 is configured to support and fix the shell 200, so as to limit the position of the shell 200 and ensure the stability of the shell 200 under force.

According to some embodiments of the present application, the necking apparatus 100 further includes a first driving member (not shown), which is used for driving the support member 50 to lift and lower.

The first driving member may be a linear driving member that can drive the support member 50 to move linearly. The first driving member may be, but is not limited to, a single-axis manipulator, a cylinder, a hydraulic cylinder, a servo electric cylinder, or the like, and may be flexibly selected according to load requirements in practical applications.

The necking apparatus 100 is provided with the first driving member to drive the support member 50 to lift and lower, so as to drive the shell 200 to move axially, which facilitates flexible adjustment on distances of the shell 200 from the first roller 10, the second roller 20, and the inner mold 30 in the axial direction of the shell 200.

Specifically, after the first roller 10 is fed in the radial direction of the shell 200 to form the annular groove 220 on the shell 200, the first driving member may be used for driving the support member 50 to move towards one side of the open end 210 of the shell 200 in the axial direction of the shell 200, so that the shell 200 is deformed and the side wall, facing the first surface 11, of the annular groove 220 fits the first surface 11.

Moreover, based on the implementation mode of "the necking apparatus 100 includes a first roller 10, a second roller 20, an inner mold 30, and a press fitting member 40, where the pressing member 40 is disposed on the circumference of the inner mold 30", the function of the first driving member may be embodied as follows:

Before the annular groove 220 is formed on the shell 200, the first driving member may be used for driving the support member 50 to move towards one side of the open end 210 of the shell 200 in the axial direction of the shell 200, so that the open end 210 of the shell 200 is inserted into a limit gap between the press fitting member 40 and the outer circumferential surface of the inner mold 30, and the press fitting member 40 and the inner mold 30 clamp the open end 210 together to limit the outward movement of the open end 210.

Before the necked portion 230 is formed on the shell 200, the first driving member may be used for driving the support member 50 to move away from one side of the open end 210 of the shell 200 in the axial direction of the shell 200, so that the open end 210 of the shell 200 is pulled away from the limit gap between the press fitting member 40 and the outer circumferential surface of the inner mold 30, the limit on the open end 210 is released, and the open end 210 can be folded outward to form the flanged portion 240.

After the open end is folded outward to form the flanged portion 240, the first driving member may be used for driving the support member 50 to move towards one side of the open end 210 of the shell 200 in the axial direction of the shell 200, so that the flanged portion 240 is flattened between the press fitting member 40 and the second roller 20.

With reference to FIG. 6 to FIG. 18, some embodiments of the present application provide a necking apparatus 100. The necking apparatus 100 is used for forming a necked portion 230 on a shell 200, the shell 200 has an open end 210, and the necking apparatus 100 includes a first roller 10, a second roller 20, an inner mold 30, a press fitting member 40, and a support member 50.

The first roller 10 is configured to feed in a radial direction of the shell 200 to form an annular groove 220 on the shell 200, and the second roller 20 is configured to feed in the radial direction of the shell 200 to form a necked portion 230 and a flanged portion 240 on the shell 200. A thickness of the first roller 10 is smaller than that of the second roller 20, the first roller 10 has a first surface 11 and a second surface 12 axially opposite, the second roller 20 has a third surface 21 and a fourth surface 22 axially opposite, the third surface 21 is farther from the open end 210 than the fourth surface 22, and a plane where the third surface 21 is located is between the first surface 11 and the second surface 12.

The inner mold 30 is used for supporting the shell 200 from the inside of the shell 200, and the first roller 10 and the second roller 20 are disposed on a circumference of the inner mold 30. Two first rollers 10 and two second rollers 20 are configured, and the first rollers 10 and the second rollers 20 are spaced in a circumferential direction of the inner mold 30.

An outer circumferential surface of the inner mold 30 includes a first outer circumferential surface 31, a second outer circumferential surface 32, and a step surface 33, a diameter of the first outer circumferential surface 31 is greater than that of the second outer circumferential surface 32, and the step surface 33 connects the first outer circumferential surface 31 and the second outer circumferential surface 32, where the press fitting member 40 is annular, the press fitting member 40 is sleeved on the first outer circumferential surface 31, and the press fitting member 40 is movable in an axial direction of the shell 200. The step surface 33 is used for clamping the open end 210 together with the press fitting member 40, the second outer circumferential surface 32 is used for mating with the first roller 10 to form the annular groove 220, and the second outer circumferential surface 32 is used for mating with the second roller 20 to form the necked portion 230.

The support member 50 is used for supporting the shell 200 to fix the position of the shell 200.

The necking apparatus 100 of the present application is used for necking and flanging of the shell 200, specifically including:

As shown in FIG. 9 and FIG. 10, the shell 200 is fixed by the support member 50, so that the central axis of the shell 200 is fixed, and the open end 210 of the shell 200 faces the inner mold 30; the inner mold 30 extends into the shell 200 via the open end 210, the step surface 33 of the inner mold 30 matches an inner circumferential surface of the shell 200, and the press fitting member 40 moves in an axial direction of the inner mold 30 (in the same direction as the axial direction of the shell 200), so that the open end 210 is clamped between the step surface 33 and an inner circumferential surface of the press fitting member 40;

As shown in FIG. 11 and FIG. 12, the first roller 10 is driven to be fed in a radial direction of the shell 200, and the first roller 10 is driven to rotate around the shell 200, so that a radius of rotation of the first roller 10 gradually decreases, the first roller 10 squeezes the shell 200, and the shell 200 is compressed and deformed by force until the annular groove 220 fits the second outer circumferential surface 32 of the inner mold 30;

As shown in FIG. 13 and FIG. 14, the shell 200 is driven to move axially, so that the shell 200 is deformed, and the first surface 11 fits the first side wall 221, facing the first surface 11, of the annular groove.

As shown in FIG. 15 and FIG. 16, the press fitting member 40 is driven again to move in the opposite direction to release the open end 210 of the shell 200, the second roller 20 is driven to feed in the radial direction of the shell 200, and the second roller 20 is also driven to rotate around the shell 200, so that the radius of rotation of the second roller 20 gradually decreases, the second roller 20 squeezes the shell 200, and the shell 200 is compressed and deformed by force until the necked portion 230 fits the second outer circumferential surface 32 of the inner mold 30. In this process, the open end 210 of the shell 200 is gradually folded outward along the connection between the step surface 33 and the second outer circumferential surface 32, to form a preliminary flanged portion 240.

As shown in FIG. 17 and FIG. 18, the press fitting member 40 is driven again to move in the axial direction of the inner mold 30 towards the fourth surface 22 of the second roller 20 until the flanged portion 240 is flattened between the fourth surface 22 of the second roller 20 and the press fitting member 40.

It can be understood that the press fitting member 40 can flatten the flanged portion 240 after the necked portion 230 is completely formed, or gradually move while the necked portion 230 is formed (namely, in the forming process of the flanged portion 240) until the necked portion 230 is formed and the flanged portion 240 is flattened between the press fitting member 40 and the fourth surface 22 of the second roller 20.

Some embodiments of the present application further provide a battery manufacturing device, including the necking apparatus 100 as described in any of the foregoing solutions, where the necking apparatus 100 is used for forming a necked portion 230 on a battery shell 200.

It should be noted that the features in the embodiments of the present application may be combined with each other on a non-conflict basis.

Although the present application is described with reference to the preferred embodiments, various improvements can be made and equivalents can be substituted for components therein without departing from the scope of the present application. In particular, as long as there is no structural conflict, various technical features mentioned in the embodiments may be combined in any way. The present application is not limited to the specific embodiments disclosed herein, but includes all technical solutions falling within the scope of the claims.

What is claimed is:

1. A necking method, for forming a necked portion on a shell with an open end, comprising steps of:

forming an annular groove on the shell, wherein the annular groove extends in a circumferential direction of the shell; and expanding a width of the annular groove towards the open end to form the necked portion, wherein the step of forming an annular groove on the shell comprises:

driving a first roller to rotate around the shell and feed in a radial direction of the shell, so as to form the annular groove on the shell; and the step of expanding a width of the annular groove towards the open end to form the necked portion comprises:

driving a second roller to rotate around the shell and feed in the radial direction of the shell, so as to form the necked portion on the shell, wherein the second roller has a third surface and a fourth surface opposite in its axial direction, the third surface is farther from the open end than the fourth surface, and a plane where the third surface is located is between two surfaces of the first roller opposite in its axial direction.

2. The necking method according to claim 1, wherein the step of forming an annular groove on the shell comprises:

limiting the open end when forming the annular groove, so as to limit outward movement of the open end.

3. The necking method according to claim 2, wherein the step of expanding a width of the annular groove towards the open end to form the necked portion comprises:

releasing the limit on the open end when expanding the width of the annular groove, so that the open end is folded outward to form a flanged portion.

4. The necking method according to claim 3, further comprising:

flattening the flanged portion.

5. The necking method according to claim 1, wherein the first roller has a first surface and a second surface opposite in its axial direction, and the first surface is farther from the open end than the second surface; and the step of forming an annular groove on the shell further comprises:

driving the shell to move axially after driving the first roller to rotate around the shell and feed in the radial direction of the shell, so that the shell is deformed, making the first surface attach to a side wall of the annular groove facing the first surface.

6. A necking apparatus, configured for forming a necked portion on a shell with an open end, comprising:

a first roller, configured to feed in a radial direction of the shell to form an annular groove on the shell;

a second roller, configured to feed in the radial direction of the shell to form a necked portion and a flanged portion on the shell;

an inner mold, configured for supporting the shell from interior of the shell; and a press fitting structure disposed around the inner mold, wherein the first roller has a first surface and a second surface opposite in its axial direction, and the second roller has a third surface and a fourth surface opposite in its axial direction, wherein the third surface is farther from the open end than the fourth surface, and a plane where the third surface is located is between the first surface and the second surface, the first roller and the second roller are disposed on a circumference of the inner mold, and the press fitting structure is configured to:

clamp the open end together with the inner mold when the first roller is fed in the radial direction of the shell, to limit outward movement of the open end.

7. The necking apparatus according to claim 6, wherein a thickness of the first roller is less than that of the second roller.

8. The necking apparatus according to claim 6, wherein the press fitting structure is movable in an axial direction of the shell, and is configured to:

flatten the outward folded open end on the second roller when the second roller is fed in the radial direction of the shell.

9. The necking apparatus according to claim 6, wherein the press fitting structure is annular, and the press fitting structure is sleeved on the inner mold.

10. The necking apparatus according to claim 6, wherein an outer circumferential surface of the inner mold comprises a first outer circumferential surface, a second outer circumferential surface, and a step surface, wherein a diameter of the first outer circumferential surface is greater than that of the second outer circumferential surface, and the step surface connects the first outer circumferential surface and the second outer circumferential surface, wherein the press fitting structure is annular, the press fitting structure is sleeved on the first outer circumferential surface, the step surface is configured for clamping, together with the press fitting structure, the open end, the second outer circumferential surface is configured for mating with the first roller to form the annular groove, and the second outer circumferential surface is configured for mating with the second roller to form the necked portion.

11. The necking apparatus according to claim 10, wherein the step surface transitions to the second outer circumferential surface in an arc.

12. The necking apparatus according to claim 6, wherein the first roller and the second roller are spaced in a circumferential direction of the inner mold.

13. The necking apparatus according to claim 6, further comprising:

a support structure to support the shell.

14. The necking apparatus according to claim 13, further comprising:

a first driver to drive the support structure up and down.

15. A battery manufacturing device, comprising the necking apparatus according to claim 6, wherein the necking apparatus is configured for forming the necked portion on a battery shell.

* * * * *